July 17, 1923.

Re. 15,658

J. H. COPE

HAYSTACKER

Original Filed Feb. 27, 1920 2 Sheets-Sheet 1

Inventor

Joseph H. Cope.

By A. J. O'Brien

Attorney

July 17, 1923.

Re. 15,658

J. H. COPE

HAYSTACKER

Original Filed Feb. 27, 1920 2 Sheets-Sheet 2

Inventor

Joseph H. Cope.

By A. J. O'Brien

Attorney

Reissued July 17, 1923. Re. 15,658

UNITED STATES PATENT OFFICE.

JOSEPH H. COPE, OF DENVER, COLORADO, ASSIGNOR TO THE WINDSOR MANUFACTURING COMPANY, OF WINDSOR, COLORADO, A CORPORATION OF COLORADO.

HAYSTACKER.

Original No. 1,426,961, dated August 22, 1922, Serial No. 361,833, filed February 27, 1920. Application for reissue filed April 26, 1923. Serial No. 634,859.

*To all whom it may concern:*

Be it known that I, JOSEPH H. COPE, a citizen of the United States, residing at the city and county of Denver, State of Colorado, have invented certain new and useful Improvements in Haystackers; and I do declare the following to be a full, clear, and exact description of the invention, such as will enable others skilled in the art to which it pertains to make and use the same, reference being had to the accompanying drawings, and to the characters of reference marked thereon, which form a part of this specification.

The object of this invention is to provide an efficient and cheaply constructed device for the purpose stated.

Briefly, the invention comprises a ground frame provided with upstanding standards to which are pivoted the lifting arms of the stacker, the lifting arms being positioned directly above the longitudinally extending timbers of the ground frame. The extension arms are slidable upon the lifting arms and are adapted to be extended by means of two-part jointed links. The forward end of one of the link parts on each side of the device is adapted to be pivoted on the extension arm at any one of a plurality of points, according to the amount of extension desired. The rear end of the other part of each link is pivoted to the rear of the framework, and this part extends through a stop device which extends upwardly, the lower end thereof being mounted either on the pivot for the corresponding lifting arm, or on a pivot on the framework at some point adjacent the said lifting arm pivot. Lifting means for elevating the stacker head are provided in the form of an A-frame, connected with the ground frame, rods connected with the ground frame, rods connected with the upper end of the A-frame and with the lifting arms, and block and tackle for elevating the same.

Figure 1:
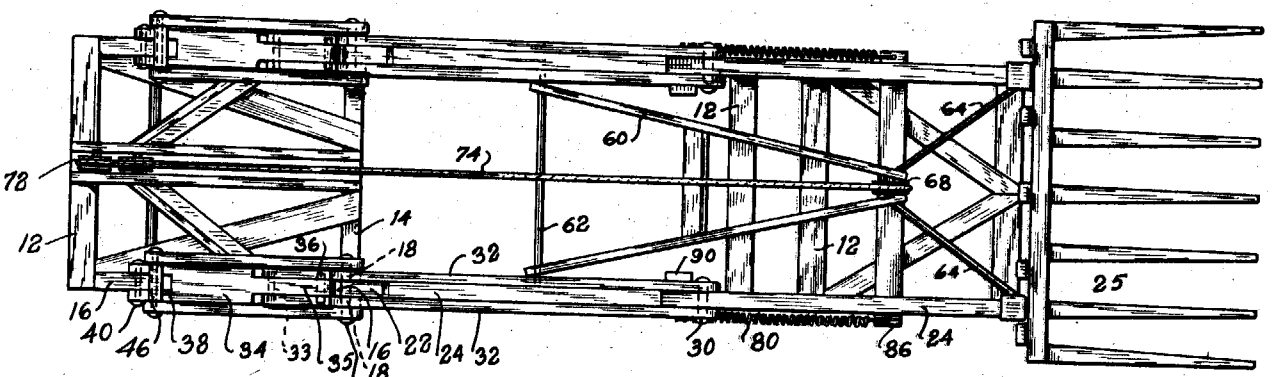
Fig. 1 is a plan of the invention.
Figure 2:
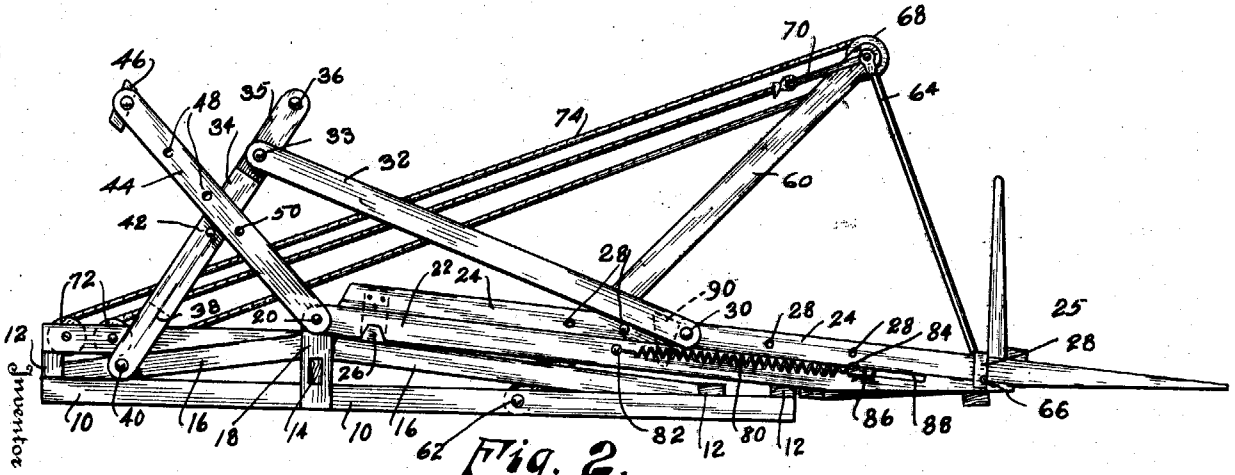
Fig. 2 is a side elevation showing the device in lowered position.

The ground frame comprises longitudinally extending timbers 10 and bars 12. A transverse beam 14 rests upon the timbers 10 and the abutting ends of truss bars 16 rest upon this beam, the opposite ends of the truss bars bearing upon the tops of the timbers 10. Short, upright standards or posts 18 are secured to the sides of each of the timbers 10 and the adjacent truss bars 16, the ends of the beam 14 projecting through these posts, as indicated in Fig. 2. At 20 the lifting arms 22 are pivotally mounted between the upper ends of the posts 18, so that these arms 22 lie directly above the timbers 10 and the adjacent truss bars 16. Extension arms 24 are slidably mounted upon the lifting arms 22 and retained in such relation by means of suitable guides 26. The extension arms 24 are provided with a plurality of holes 28, in any one of which a pin 30 may be positioned for the purpose of pivoting the forward ends of the forward sections 32 of the extension links. The sections 32 are pivoted at 33 to the rear sections 34 of the links. Each section 34 has its upper end in the form of a tongue 35, carrying a transverse pin 36 to serve as a stop for the adjacent section 32. The lower end of each section 34 is forked as indicated at 38, in order to straddle the truss bar 16 therebeneath, to which it is pivoted at 40. Each section 34 carries a transverse pin 42, as indicated in Fig. 2, for the purpose of holding in elevated position the arms 44 of a stop element, which carries at its upper end a stop block 46, against which the section 34 bears when the stacker is in elevated position. The lower ends of the arms 44 may be pivoted on the pivot 20, which is also the pivot point for the lifting arms 22. The arms 44 are provided with a plurality of apertures 48 for receiving a removable pin 50, which is adjustable with the links 32, 34, according to the amount of extension desired. This pin 50 is to engage the forward face of the section 34 to limit its forward movement as the head descends in order to assure complete retraction of the extension arms 24.

An A-frame 60 is pivoted at 62 to the timbers 10 and has connected with its upper end a pair of lifting rods 64, which are connected with the forward ends of the lifting arms 22 as indicated at 66. The upper end of the frame 60 also carries a pulley 68, and an eye 70. The rear end of the framework carries a pair of pulleys 72, and over these parts a cable 74 is threaded for operating the A-frame 60 and the lifting rods 64.

Each of the lifting arms 22 has a spring 80 connected thereto at 82, the opposite end of the spring being provided with a hook 84, which engages a crossbar 86, adapted to slide in slots 88 in the upper sides of the lifting arms 22. Blocks 90, secured to the inner sides of the inner arms of the link sections 32 project down into position to engage with the rear edge of the bar 86, in order to advance said bar 86 in the slots 88 and tension the springs 80 when the arms 24 are extended.

In the operation of the device, the stop arms 44 bear upon the transverse pins 42 of the sections 34 in order to retain said arms in the position shown. The forward ends of the sections 32 are set in one of the holes 28, to give the extension required, and the pins 50 are set accordingly.

As the lifting arms 22 are elevated through the medium of the A-frame 60 and the rod 64, the sections 34 move rearward through the medium of the sections 32 until said sections 34 engage with the blocks 46 on the upper ends of the stop arms 44. As elevation continues, the link sections 32 cause the extension arms 24 to slide outwardly upon the lifting arms 22, since movement of the sections 34 is prevented by the blocks 46. During this movement the blocks 90 on the link sections 32 come into engagement with the transverse bar 86 and during the latter part of the extension of the arms 24 this bar 86 places the springs 80 under tension so that when the stacker head has passed over the dead center, at pivot 20, the springs 80 are under considerable tension, which is transmitted by means of the bar 86 and the blocks 90 to the links 32, and thereby to the extension arms 24 through the pins 30. Thus, after the load has been thrown from the stacker head 25 and draft on the cable 74 is released, the springs 80 will cause the arms 24 and head 25 to be drawn back over the dead center at 20, whereupon the weight of the head will cause the same to descend.

The transverse pins 36 in the upper ends of the tongues 35 of the link sections 34, serve as stops for the link sections 32 when the stacker head is at its uppermost and rearmost position. By this means doubling back of the link sections 32 and 34 about the pivot points 33 is prevented.

It will be noted particularly that the construction here disclosed with reference to the link sections 32 and 34 and the stop arms 44 and stop blocks 46, is novel. Also, the pivoting of the lifting arms 22 directly above the timbers 10 is novel.

Figure 3:
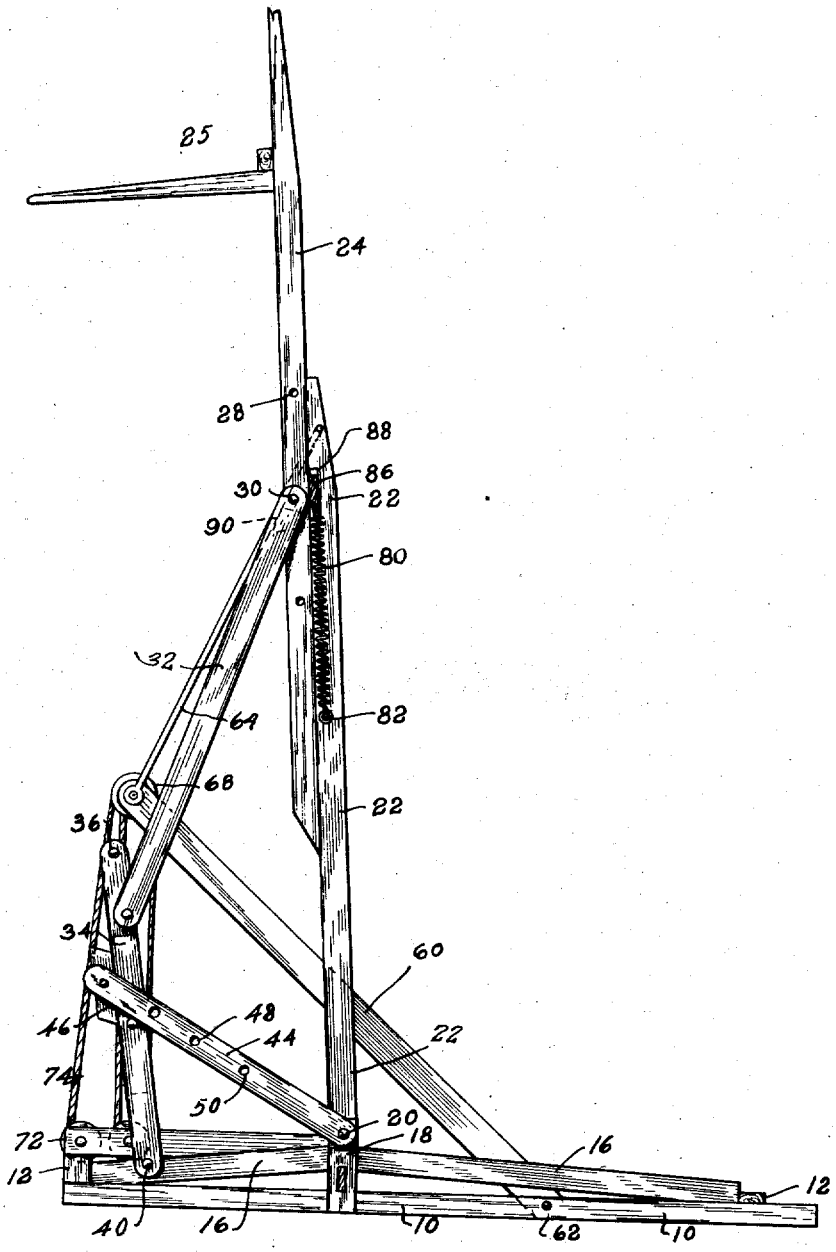
Fig. 3 is a side elevation showing the device extended almost to the limit of elevation.

When the lifting arm passes the dead center with a heavy load of hay on the stacker-head, there is naturally considerable momentum in the moving parts and this tends to carry the parts beyond the vertical to a greater extent than necessary. Such excessive movement of the stacker-head is positively prevented by the fact that the transverse bar 86 will engage the upper ends of the slots 88 and form a positive stop which causes the member 32 to function as a brace in the manner clearly apparent from Fig. 3. When the links function to extend the extension arm, the force exerted by the member 32 will operate in a direction inclined at an angle to the arm 24 and there will consequently be a resultant force which tends to hold the extension arm against the lifting arm and thereby to keep them parallel.

I claim:

1. In a stacker; a main frame; a slibable extension arm; a stacker head on said arm; means to lift said arm and head; and means for extending said arm comprising a jointed link having two members pivoted together, one of which is pivoted to the frame and the other is pivoted to the extension arm.

2. In a stacker; a main frame; a slidable extension arm; a stacker head on said arm; means to lift said arm and head; a jointed link for extending said arm comprising two members pivoted together, one of which is pivoted to the frame and the other is pivoted to the extension arm; and means to limit both forward and rearward movement of that link member which is pivoted to the frame.

3. In a stacker; a main frame; a lifting arm; an extension arm slidable on said lifting arm; means to lift said arms and head; and means to slide said extension arm on the lifting arm comprising a jointed link having two members pivoted together, one of which is pivoted to the main frame and the other to the extension arm.

4. In a stacker; a main frame; a lifting arm; an extension arm slidable on said lifting arm; means to lift said arms and head; and means to slide said extension arm on the lifting arm comprising a jointed link having two members pivoted together, one of which is pivoted to the main frame and the other to the extension arm; and means to limit both forward and rearward movement of that link member which is pivoted to the frame.

5. In a stacker; a main frame; a lifting arm; an extension arm slidable on said lifting arm; means to lift said arms and head; and means to slide said extension arm on the lifting arm comprising a jointed link having two members pivoted together, one of which is pivoted to the main frame and the other to the extension arm; and a spring pull-back adapted to be placed under tension as said lifting arm approaches its limit of movement.

6. In a stacker; a main frame; a lifting arm; an extension arm slidable on said lifting arm; means to lift said arm and head; a jointed link comprising two members pivoted together, one of which is pivoted to the main frame and the other to the extension arm; a spring pull-back adapted to be placed under tension as said lifting arm approaches its limit of movement, said pull-back comprising means slidable on said lifting arm; a spring connecting said means with said lifting arm; and a device on said link to engage said means to extend the same.

7. In a stacker; a main frame; a slidable extension arm thereon; a stacker head on the arm; means to lift the arm and head; and means for extending said arm as it is lifted comprising a jointed link pivoted to the arm and to the frame.

8. In a stacker; a main frame; a lifting arm; an extension arm slidable on said lifting arm; a stacker head on said extension arm; means to lift said arms and head; and means for sliding the extension arm on the lifting arm comprising a jointed link pivoted to the extension arm and to the frame.

9. In a stacker; a main frame; an extension arm having a stacker head thereon; means to lift said arm and head; a jointed link for extending said arm as it is lifted comprising two members, one member being pivoted to the main frame and the other to the extension arm; and means to limit the rearward movement of said link members.

10. In a stacker; a main frame; an extension arm having a stacker head thereon; means to lift said arm and head; a jointed link for extending said arm as it is lifted comprising two members pivoted together, one member being pivoted to the main frame and the other to the extension arm; means to limit the rearward movement of said link members; and a guide for said link.

11. In a stacker; a main frame; an extension arm having a stacker head thereon; means to lift said arm and head; a jointed link comprising two members pivoted together, one member being pivoted to the main frame and the other to the extension arm; and means to limit the rearward movement of said link members, said limiting means comprising a guide and a stop on said guide for engagement by the link.

12. In a stacker; a main frame; a lifting arm pivoted to the frame; an extension arm slidable on said lifting arm; a link member pivoted at the rear of the pivot of said lifting arm; a second link member pivoted to the first mentioned member and pivoted also to said extension arm; a stacker head on said extension arm; means to lift said arms and head; and a spring pull-back adapted to be placed under tension as said lifting arm approaches its limit of movement.

13. In a stacker; a main frame; a lifting arm pivoted to the frame; an extension arm slidable on said lifting arm; a link member pivoted in the rear of the pivot of said lifting arm; a second link member pivoted to the first mentioned link member and pivoted also to said extension arm; a stacker head on said extension arm; means to lift said arms and head; means to limit both forward and rearward movement of that link member which is pivoted to the frame; and a spring pull-back adapted to be placed under tension as said lifting arm approaches its limit of movement.

14. In a stacker; a main frame; a lifting arm pivoted on the frame; an extension arm slidable on the lifting arm; a link member pivoted on the frame; a second link member pivoted to the first mentioned member and pivoted also to said extension arm; a stacker head on said extension arm; and means to lift said arms and head; a stop member for said link, the upper portion of the first mentioned link member being adapted to engage said stop member when the stacker is in elevated position, and the pivot point of the second member on the extension arm being adapted to lie forward of the center line of said first member when in said position, to prevent collapse of said members under load.

15. In a stacker; a main frame; a lifting arm pivoted on the frame; an extension arm slidable on the lifting arm; a link member pivoted on the frame; a second link member pivoted to the first mentioned member and pivoted also to said extension arm; a stacker head on said extension arm; and means to lift said arms and head, the upper part of the first mentioned link member being adapted to be retained in position when said stacker is elevated to prevent collapse of said link members under load.

16. In a stacker; a main frame; a lifting arm pivoted on the frame; an extension arm slidable on the lifting arm; a link member pivoted on the frame; a second link member pivoted to the first mentioned member and pivoted also to said extension arm; a stacker head on said extension arm; means to lift said arms and head; and a stop to be engaged by the upper part of the first mentioned link member to retain the latter in position when said stacker is elevated to prevent collapse of said link members under load.

17. In a stacker; a main frame; a lifting arm pivoted thereto; an extension arm slidable on the lifting arm; a link member pivoted on the frame; a second link member pivoted to the first mentioned member and pivoted also to said extension arm; a stacker head on said extension arm; means to lift said arms and head; a stop connected with the frame and adapted to be engaged by the upper part of the first mentioned link member to limit the movement thereof.

18. In a stacker; a main frame; comprising a post; a longitudinally extending timber; spaced members connected with the upper portion of said post and with said timber; braces on the sides of the timber; a lifting arm; an extension arm slidable on said lifting arm; a link connected at one end to said extension arm and having the other end extending between and guided by said spaced members, the lifting arm being positioned directly above said timber with its rear end lying between said braces.

19. In a stacker; a main frame; spaced members connected with said frame; a lifting arm; an extension arm slidable thereon, the rear end of the lifting arm lying between said spaced members; and a link connected at one end to said extension arm and having the other end extending between and guided by said spaced members.

20. In a stacker; a main frame; spaced guides connected with said frame; a lifting arm; an extension arm slidable thereon; a link member connected at one end to said extension arm; and a second link member connected at one end to said frame and at its other end to the first named link member, said second member extending between and guided by said spaced guides.

21. In a stacker; a lifting arm; an extension arm; a two-part jointed link to extend the extension arm; and a stop to be engaged by one part of said link to limit rearward motion.

22. In a stacker; a lifting arm; an extension arm; a jointed link to extend the extension arm; and a stop to be engaged by said link to limit rearward motion, one end of the link being pivoted to the extension arm and the other end to the frame.

23. In a stacker; a frame including a ground timber; a pivoted lifting arm lying over said timber; an extension arm slidable on said lifting arm; means to lift said arms; and means to extend said extension arm as said arms are being lifted, said extension means comprising a jointed link connected with the frame and with the extension arm.

24. In a stacker; a frame including a ground timber; a post secured to said timber; a lifting arm lying over said timber and pivoted to said post; an extension arm slidable on said lifting arm; means to lift said arms; and means to extend said extension arm while the arms are being lifted, said extending means comprising a two-part jointed link connected with the extension arm.

25. In a stacker; a frame including a ground timber; a post secured at the side of said timber; a lifting arm lying directly above said timber and pivoted to said post; an extension arm slidable on said lifting arm; means to lift said arms; and means to extend said extension arm while the arms are being lifted, said extending means comprising a jointed link having one part pivoted to the extension arm and another part pivoted to the frame.

26. In a stacker; a frame including a ground timber; a post secured at the side of said timber; a lifting arm lying directly above said timber and pivoted to said post; an extension arm slidable on said lifting arm; means to lift said arms; means to extend said extension arm while the arms are being lifted, said extending means comprising a jointed link having one part pivoted to the extension arm and another part pivoted to the frame; and a stop for limiting the rearward movement of said link.

27. In a stacker; a lifting arm; an extension arm; and means comprising a two-part jointed link to extend the extension arm.

28. In a stacker; a lifting arm; an extension arm; and means comprising a two-part jointed link to extend the extension arm, said jointed link being pivotally mounted.

29. In a stacker; a lifting arm; an extension arm; a two-part jointed link to extend the extension arm; and a stop to be engaged by one part of said link to limit motion.

30. In a stacker; a lifting arm; an extension arm; a two-part jointed link to extend the extension arm; and a stop to be engaged by one part of said link to limit motion, said jointed link being pivotally mounted.

31. In a stacker; a main frame; a slidable extension arm; a stacker head on said arm; means to lift said arm and head; and a jointed link to extend the extension arm comprising two relatively movable connected members.

32. In a stacker; a main frame; a slidable extension arm; a stacker head on said arm; means to lift said arm and head; and a jointed link to extend the extension arm comprising two relatively movable connected members, said jointed link being pivotally mounted.

33. In a stacker; a main frame; a slidable extension arm; a stacker head on said arm; means to lift said arm and head; and a jointed link comprising two members, one of said members being adapted to be pivotally connected with said extension arm and in fixed relation thereto; means being provided for providing said fixed pivotal connection at various points as desired to furnish various adjustments for varying extensions of said head.

34. In a stacker; a main frame; a slidable extension arm; a stacker head on said arm; means to lift said arm and head; a jointed link comprising two members pivoted together, one of said members being connected with said extension arm; and a stop adapted to be engaged by the other member of said link to limit motion thereof.

35. In a stacker; a main frame; a slidable extension arm; a stacker head on said arm; means to lift said arm and head; and a jointed link comprising two members, one of said members being connected with the extension arm and bodily movable with respect to said frame.

36. A stacker comprising, in combination, a ground timber; a pivoted lifting arm lying directly above said timber; a pair of spaced upwardly projecting post members provided with a pivot pin near their tops for cooperating with the lifting arm; an extension arm slidable on said lifting arm; and means comprising a two-part jointed link for sliding said extension arm on the lifting arm as the latter is moved about its pivot.

37. In a stacker; a frame; a backstop; a two-part extension link, one part of which is adapted to engage said stop; a lifting arm with which the other part of the link is connected, said arm being pivoted to the frame forward of the stop.

38. In a stacker; a frame; a backstop; a two-part extension link, one part of which is adapted to engage said stop; a lifting arm with which the other part of the link is operatively connected, said arm being pivoted to the frame forward of the stop, whereby said link, when engaged with said stop constitutes a brace for the elevated portions.

39. In a stacker; a main frame having a ground timber; a lifting arm thereon; an extension arm on the lifting arm; and an inclined two part link connected with the extension arm, the rear end of the lifting arm being pivoted on the frame at a point elevated from the ground timber so as to cause the lifting arm to incline downward as it extends forward, whereby the link is nearer in line with the lifting arm.

40. In a stacker; a main frame having substantially parallel sides; a lifting frame having parallel arms on said frame; a pair of spaced braces secured to each of said frame sides, the ends of the lifting arms lying over the sides of the frame and pivoted between said braces.

41. In a stacker; a lifting arm; an extension arm; a two-part jointed link to extend the extension arm; a stop to be engaged by one part of said link to limit rearward movement thereof; and means at said joint to limit swinging of the other part about the joint to prevent doubling back at the joint.

42. In a stacker; a frame; a lifting arm; an extension arm; a two-part jointed link to extend the extension arm; a stop to be engaged by one part of the link to limit rearward movement thereof, one part of the link having a portion extending beyond said joint; and means on said extending portion to engage the other part of the link and prevent doubling back at said joint.

43. In a stacker; a main frame; a lifting arm pivotally secured thereto; an extension arm slidable on the lifting arm; means to lift said arms; and means to extend said extension arm as said arms are being lifted, said extension means comprising a jointed link, one part of which is pivotally connected to said frame at a point located in the rear of the point where the lifting arm is pivoted, another part of said link being connected to the extension arm.

44. A main frame; a lifting arm pivotally connected to the main frame at a point intermediate the ends thereof; an extension arm slidably connected thereto; means for lifting said arms; means for sliding the extension arm on the lifting arm as the arms are being lifted, said last named means comprising a two-part link, one part of which is connected to the main frame at a point to the rear of the pivotal point of the lifting arm.

45. In a stacker in combination, a main frame including a ground timber; a post secured to said timber; a lifting arm lying above said timber and pivoted to said post; an extension arm slidable on said lifting arm; means to lift said arms; means to extend said extension arm while the arms are being lifted, said extending means comprising a jointed link having one part connected to the extension arm and another part connected to the frame at a point to the rear of the pivot of the lifting arm.

46. In a stacker in combination, a main frame; a lifting arm connected thereto at a point intermediate the ends thereof; an extension arm slidable on said lifting arm; means to lift said arms; means to extend said extension arm while the arms are being lifted, said last named means comprising a jointed link connected to said extension arm and to the frame; spring means adapted to be put under tension by the link as the lifting arm approaches and passes the vertical position, whereby a force is produced tending to return the arm.

47. In a stacker in combination, a main frame: including a ground timber; a post secured to the said timber at a point spaced from the rear end thereof; a lifting arm pivotally connected to the post; an extension arm slidable on said lifting arm; means to lift said arms; means to extend said extension arm while the arms are being lifted; said last named means comprising a two-part jointed link connected with said frame and said extension arm; a spring secured to said lifting arm; and means carried by one part of said link for tensioning said spring as the arms approach their final elevated position.

48. In a stacker in combination, a main frame; including a ground timber; a post secured to the said timber at a point spaced from the rear end thereof; a lifting arm pivotally connected to the post; an extension arm slidable on said lifting arm; means to lift said arms; means to extend said last named extension arm, said means comprising a two-part jointed link connected with said frame and said extension arm in such manner that the lifting frame can pass beyond the vertical position; a spring secured to said lifting arm; and means carried by one part of said link for tensioning said spring as the arms approach their final elevated position, whereby a force will be produced tending to return the arms.

49. In a stacker in combination, a main frame including a ground timber; a post secured to the said timber at a point forwardly of the rear end thereof; a lifting arm pivoted to the post; an extension arm slidable on said lifting arm; means to lift said arms; means to extend said extension arm, said means comprising a jointed link composed of two parts, one of said parts being pivotally connected to the extension arm, the other part being pivotally connected to the frame at a point to the rear of said post, whereby the lifting arm may swing past the vertical position; a spring secured to the lifting arm; means carried by the link connected to the extension arm for tensioning the spring as the arms approach and pass the vertical position, whereby a force is produced which tends to return the arms to their normal position; and guides cooperating with the portion of the jointed link which is connected to the main frame.

50. In a stacker, a main frame; a lifting arm connected thereto; means for lifting said arm; resilient means for producing a force tending to return the lifting arm to normal position; and a two-part jointed link for tensioning said resilient means as the arm approaches its raised position.

51. A stacker adapted to permit the stacker-head to move beyond the vertical position, comprising in combination, a main frame; a lifting arm pivotally connected thereto; an extension arm movably connected to the lifting arm; a stacker-head on the extension arm; means for lifting said arms and head; a two-part permanently connected link operatively connected between the main frame and the extension arm for extending the same as it is lifted; and resilient means for producing a force tending to return said arms.

52. In a stacker; a main frame; a lifting arm pivotally connected thereto; an extension arm movably connected to the lifting arm; means for lifting said arms; an extending device comprising two movably connected parts operatively connected with the main frame and the lifting arm, said device being also operatively connected with the extension arm to extend the same as the arms are being lifted; and means comprising a spring adapted to be put under tension by the extending device as the lifting arm approaches the end of its stroke, whereby a force is produced tending to return the arms.

53. In a stacker; a main frame; a lifting arm attached thereto; an extension arm movably connected with the lifting arm; means for lifting said arms; a device having two movably connected parts operatively connected with the main frame and with the extension arm; that portion of the device connected with the extension arm pivoting around the extension arm connection as a center as the arms are raised.

54. In a stacker; a main frame; a lifting arm attached thereto; an extension arm movably connected to the lifting arm; means for lifting said arms; a device having two movably connected parts, said device being pivotally connected with the frame and pivotally connected with the extension arm; that portion of the device connected with the extension arm swinging around said pivot as a center as the arms are raised.

55. In a stacker that will permit the head to be carried beyond a vertical position and will continue to extend after passing this point, comprising, in combination, a main frame; a lifting arm pivotally connected thereto; an extension arm movably connected to the lifting arm; a head on the extension arm; means for lifting said arms and head; a device having two connected parts cooperatively connected to the main frame and with the extension arm; the portion of the device connected with the extension arm adapted to swing around that pivot as a center.

56. In a stacker that will permit the head to be carried beyond a vertical position and will continue to extend after passing this point, comprising, in combination, a main frame; a lifting arm pivotally connected thereto; an extension arm movably connected to the lifting arm; a head on the extension arm; means for lifting said arms and head; a device having movably connected parts operatively connected to the main frame and lifting arms and also connected to the extension arm and means for maintaining the lifting and extension arms parallel while they are being lifted.

57. In a stacker having a main frame; a lifting arm pivotally connected thereto; an extension arm on the lifting arm; and means for lifting said arms; a device comprising two connected movable parts for extending said extension arm and for producing a resultant force which tends to hold down the rear end of the extension arm as the arm is being lifted.

58. In a stacker; a main frame; a lifting arm connected thereto; an extension arm movably connected with the lifting arm; a stacker-head on the extension arm; means for lifting said arms and head; a device comprising two movable parts for extending said extension arm as it is elevated; and means for holding the extension arm and lifting arm parallel with each other during the lifting operation.

59. An extension stacker that will permit the stacker-head to be carried up to and beyond a point vertical with the lifting arm pivots and will continue to extend the extension arm and head after passing said point comprising a main frame; a lifting arm operatively connected thereto; an extension arm movably connected with the lifting arm; a head on the extension arm; a device comprising two movable parts operatively connected with the main frame and extension arm for extending the arm as it is being elevated; and means to keep the lifting and extension arms parallel one with the other during the lifting operation.

60. An extension stacker that will permit the head to be carried beyond a vertical position and continue to extend after passing said vertical position; the combination of a main frame; a lifting arm connected thereto; an extension arm movable on the lifting arm; a head on the extension arm; means for lifting the arms and head adapted to carry the arms and head beyond said vertical position; a device comprising two movable connected parts for extending said extension arm as it is elevated; and means for holding the extension arm and the lifting arm parallel to each other during the lifting operation.

61. In a stacker that will permit the head to be carried beyond a vertical position and continue to extend after passing said vertical position; the combination of a main frame; a lifting arm connected thereto; an extension arm movable on the lifting arm; a head on the extension arm; means for lifting the arms and head adapted to carry the arms and head beyond said vertical position; a device comprising two movable parts for extending said extension arm and head as they are elevated; and means for holding the extension arm and the lifting arm parallel to each other during the lifting operation, said movably connected parts being movably connected with the main frame and the extension arm.

62. In a stacker; a main frame; a lifting arm pivotally connected thereto; an extension arm slidable on the lifting arm; a two-part link connected to the frame and to the extension arm; and a stop in the path of and adapted to be engaged by one part of said link, whereby the movement of said lifting arm will be limited in one direction.

63. In a stacker; a main frame; a lifting arm connected thereto; means for lifting said arm; and bracing means comprising a two-part jointed link.

64. In a stacker; a main frame; a lifting arm connected thereto; means for lifting said arm; and bracing means comprising one part of a two-part jointed link.

65. In a stacker; a main frame; a lifting arm pivotally connected thereto; means to lift said arm; a two-part link operatively connected to the frame and the lifting arm; means comprising a stop carried by the lifting arm for limiting the rearward motion thereof as it reaches the limit of its movement.

66. In a stacker; a main frame; a lifting arm pivotally connected thereto; means to lift said arm; a jointed device operatively connected to the frame and the lifting arm; means comprising said jointed device for limiting the rearward motion of the lifting arm as it reaches the limit of its travel and means for maintaining the lifting and extension arms parallel as they are lifted.

67. In a stacker; a main frame; a lifting arm pivotally connected thereto; an extension arm on the lifting arm; means for lifting said arms; a stop mechanism comprising two movable connected parts operatively connected between said lifting arm and main frame for limiting the rearward movement of the lifting arm and means for maintaining the lifting and extension arms parallel as they are lifted.

68. In a stacker; a main frame; a lifting arm pivotally connected thereto at a point above the ground and forwardly of the rear end thereof; an extension arm on the lifting arm; means for lifting said arms; and a stop mechanism comprising two movable permanently connected parts operatively connected to said lifting arm and main frame for limiting the rearward movement of the lifting arm.

69. In a stacker; a main frame; a lifting arm pivoted thereto; means for lifting said arm; a link operatively connected with the main frame and the lifting arm, said link comprising two relatively movable connected parts; a stop located in the path of one of said parts to limit the movement thereof in one direction and cause the link to function as a brace for the lifting arm.

70. In a stacker; a main frame; a lifting arm pivotally connected thereto; an extension arm slidably connected to the lifting arm; a link comprising two parts connected together, pivotally connected to the main frame and operatively connected to the lifting arm, said link being also connected to the extension arm for extending the same; means for lifting the said arms; and means comprising said link for limiting the movement of the lifting arm after it has passed the vertical position.

71. In a stacker; a main frame; a lifting arm connected thereto; an extension arm on the lifting arm; a stacker-head carried by the extension arm; means for lifting said arms and head; a device connected with the main frame and the extension arm to extend said extension arm as the arms are being lifted, said device comprising two relatively movable connected parts, one of the members of the stacker having a striking point located in the path of one of said parts to limit the movement of said arms in one direction and cause the device to function as a brace for said arms.

72. In a stacker; a main frame; a lifting arm thereon; an extension arm on the lifting arm; a stacker-head on the extension arm; means to lift said arms and head; means to extend said extension arm as the same is being lifted and to form a brace for said arms when said arms reach the limit of their movement, said means including two relatively movable parts permanently connected together and pivotally connected to said frame and extension arm.

73. In a stacker; a main frame; a lifting arm attached thereto; an extension arm movably connected with the lifting arm; means to lift said arms; a link member operatively connected to the main frame; a second link member operatively connected to the extension arm, the two link members being operatively connected together in such a manner as to permit of various adjustments being made for varying the degree of extension of the extension arms as said arms are being lifted.

74. In a stacker wherein the head can be carried beyond a point vertical of the pivot point of the lifting arm, comprising a main frame; a lifting arm pivoted thereto; an extension arm on the lifting arm; a head on the extension arm; means to lift said arms; a device connected with the main frame and the extension arm to extend the extension arm as it is being lifted, said device comprising two relative movable connected parts; and means to keep the lifting arm and extension arm parallel with each other during the lifting operation.

75. In a stcker; a main frame adapted to rest upon the ground; a lifting arm pivotally connected thereto at a point forwardly of the rear ends thereof; an extension slidable on the lifting arm; means for lifting said arms and a device comprising two movable connected parts for extending the extension arm as the arms are being raised and means for maintaining the arm parallel during the lifting movement.

76. In a stacker; a main frame adapted to rest upon the ground; a lifting arm pivotally connected thereto at a point above the same; an extension arm slidable on the lifting arm; means for lifting said arms; a device comprising two movable connected parts for extending the extension arm as the arms are being raised; and means for maintaining the arms parallel during the lifting movement.

77. In a stacker; a main frame adapted to rest upon the ground; a lifting arm pivotally connected thereto at a point forwardly of the rear end thereof; an extension arm slidable on the lifting arm; means for lifting said arms; a device comprising two movable connected parts for extending the extension arm as the arms are being raised; and means for maintaining the arms parallel during the lifting movement.

78. In a stacker; a main frame; a lifting arm operatively connected to said frame and adapted to oscillate with respect thereto; means for lifting said arm; a two part link operatively connected to the frame and the arm, said parts being connected together, the connection between the two link members being to the rear of the lifting arm when the latter is at the limit of its upward movement.

In witness whereof I affix my signature.

JOSEPH H. COPE.